(12) United States Patent
Clement et al.

(10) Patent No.: US 6,552,163 B1
(45) Date of Patent: Apr. 22, 2003

(54) METHOD FOR FRACTIONING POLY (ETHYLENE OXIDE) FORMED USING A METALLIC CYANIDE CATALYST

(75) Inventors: Katherine S. Clement, Lake Jackson; Louis L. Walker, Clute, both of TX (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/611,497

(22) Filed: Jul. 7, 2000

Related U.S. Application Data

(60) Provisional application No. 60/143,076, filed on Jul. 9, 1999, and provisional application No. 60/205,773, filed on May 19, 2000.

(51) Int. Cl.[7] .......................... C08G 59/68; C08G 65/30
(52) U.S. Cl. ....................... 528/412; 523/332; 528/410; 528/414; 528/493; 528/494; 528/495
(58) Field of Search ................................ 528/410, 412, 528/414, 493, 495, 494; 523/332

(56) References Cited

U.S. PATENT DOCUMENTS

| | | | | |
|---|---|---|---|---|
| 3,278,458 A | * | 10/1966 | Belner ........................ | 528/412 |
| 3,478,109 A | | 11/1969 | McConnell | |
| 3,546,331 A | * | 12/1970 | Niegisch ................ | 528/495 X |
| 4,684,715 A | * | 8/1987 | Kay et al. ............... | 528/495 X |
| 5,185,429 A | * | 2/1993 | Cinquina et al. ....... | 523/332 X |
| 5,278,282 A | * | 1/1994 | Nauman et al. ........ | 528/495 X |
| 5,426,175 A | * | 6/1995 | Sutherlin et al. ....... | 528/495 X |
| 5,731,407 A | * | 3/1998 | Le-Khac ................. | 528/412 X |
| 5,756,604 A | * | 5/1998 | Nakaoka et al. ........ | 528/410 X |
| 5,844,070 A | * | 12/1998 | Hayes et al. ............ | 528/493 X |
| 6,262,145 B1 | * | 7/2001 | Winjngaarden et al. .... | 523/332 |

FOREIGN PATENT DOCUMENTS

| | | |
|---|---|---|
| EP | 0 385 619 A2 | 9/1990 |
| WO | wO 98/17708 | 4/1998 |

OTHER PUBLICATIONS

Yen D. R. et al., "Fractional Precipitation of Star Poly(ethylene oxide)", Macromolecules, US, American Chemical Society, Easton, vol. 29, No. 27, Dec. 30, 1996, pp. 8977–8978.

* cited by examiner

Primary Examiner—Richard D. Lovering

(57) ABSTRACT

A poly(ethylene oxide) polymer having low and high molecular weight fractions is fractionated by dissolving the polymer in a solvent for the low molecular weight fraction. A good separation of the low and high molecular weight fractions can be obtained. When the poly(ethylene oxide) polymer contains a metal cyanide catalyst, this process also provides a good separation of the catalyst from the low molecular weight fraction. In this instance, the catalyst remains active and the high molecular weight fraction containing the catalyst can be recycled into subsequent polymerization processes.

21 Claims, No Drawings

METHOD FOR FRACTIONING POLY (ETHYLENE OXIDE) FORMED USING A METALLIC CYANIDE CATALYST

This application claims the benefit of U.S. Provisional Application No. 60/143,076, filed Jul. 9,1999 and U.S. Provisional Application No. 60/205,773, filed May 19, 2000.

BACKGROUND OF THE INVENTION

This invention relates to methods for purifying poly (ethylene oxide) polymers.

Polyethers are prepared in large commercial quantities through the polymerization of alkylene oxides such as propylene oxide and ethylene oxide. This polymerization reaction is usually conducted in the presence of an initiator compound and a catalyst. The initiator compound determines the functionality (number of hydroxyl groups per molecule) of the polymer and in some instances imparts some desired functional group to the polymer. The catalyst is used to provide an economical rate of polymerization.

It is desirable to produce polyethers having low polydispersities. While this is true as a general matter for many types of polyethers, it is particularly true for many poly (ethylene oxide) polymers. Polyethylene oxides tend to be solids at room temperature when the molecular weight exceeds about 700. Thus, molecular weight control is especially important when a liquid poly(ethylene oxide) is desired. Moreover, the presence of even a small amount of a high (above about 1000) molecular weight fraction in a poly(ethylene oxide) polymer can cause the entire polymer to become hazy or solidify. Even if the entire polymer is not solidified, the solid high molecular weight fraction can occlude a significant amount of low molecular weight species. As a result, yields of the desired liquid polymer are significantly reduced. To recover the desired low molecular weight portion of the reaction product, it is necessary to remove the high molecular weight fraction.

Thus, a process by which poly(ethylene oxide) polymers can be fractionated efficiently to remove a high molecular weight fraction would be desirable.

SUMMARY OF THE INVENTION

This invention is a method for purifying a poly(ethylene oxide) polymer containing a lower molecular weight fraction and at least one higher molecular weight fraction, comprising (a) mixing said poly(ethylene oxide) polymer with a compound or mixture of compounds, said compound or mixture of compounds being a solvent for said low molecular weight fraction but not for said high molecular weight fraction, in relative amounts and under conditions such that a solution of said low molecular weight fraction in said compound or mixture of compounds forms and (b) separating said solution from said high molecular weight fraction.

In a second aspect, this invention is a method for removing a metal cyanide catalyst from a poly(ethylene oxide) polymer containing a metal cyanide catalyst, a lower molecular weight fraction and at least one higher molecular weight fraction, comprising (a) mixing a poly(ethylene oxide) polymer with a compound or mixture of compounds, said compound or mixture of compounds being a solvent for said low molecular weight fraction but not for said high molecular weight fraction, in relative amounts and under conditions such that a solution of said low molecular weight fraction in said compound or mixture of compounds forms and (b) separating said solution from said high molecular weight fraction, and (c) recovering said low molecular weight fraction from said solution.

The method of the invention provides a simple and effective method for recovering a low molecular weight fraction from a poly(ethylene oxide) polymer.

An additional benefit is seen when the poly(ethylene oxide) is prepared with a metal cyanide catalyst. Surprisingly, the metal cyanide catalyst is effectively removed with the high molecular weight fraction. Thus, this invention provides a simple and effective means for removing the metal cyanide catalyst from the desired low molecular weight fraction of the product. Removal of the catalyst to levels of less than one part per million of the low molecular weight fraction is often achieved.

Even more surprisingly, the metal cyanide catalyst that is removed with the high molecular weight fraction remains active. Thus, the high molecular weight fraction that contains the catalyst can be recycled into subsequent polymerization reactions.

DETAILED DESCRIPTION OF THE INVENTION

The poly(ethylene oxide) polymer to be fractionated is one having a low molecular weight fraction and at least one distinct higher molecular weight fraction. The molecular weights of the fractions are sufficiently distinct that the fractions have different solubility characteristics. It is this difference in solubility characteristics that provides the basis upon which the method of the invention operates. Thus, polymers having continuous polydispersities over a wide range of molecular weights are less preferred, as it is difficult to obtain a good separation of the lower molecular weight species from the higher molecular weight species. On the other hand, polymers having molecular weight distributions that are often characterized as "bimodal" or "multimodal" are preferred, as the differences in molecular weights between the various fractions relates to solubility differences between the fractions.

Thus, the preferred poly(ethylene oxide) polymers have two or more fractions having distinct molecular weights, and are further characterized by containing a low amount of material in the intermediate range(s) of molecular weights. It is also preferred that the lowest molecular weight fraction has a relatively narrow polydispersity, such as less than 2.0 and more preferably less than about 1.7.

In order for the various molecular weight fractions to have sufficiently different solubility characteristics, it is preferred that the number average molecular weight of the higher molecular weight fraction be at least 1.2, more preferably at least 1.5 times, even more preferably at least about 2 times, and most preferably at least 3 times that of the low molecular weight fraction.

The low molecular weight fraction can be of any molecular weight, provided that it can be dissolved in a suitable solvent that is a poor solvent for the high molecular weight fraction. Thus, the low molecular weight fraction may have a weight average molecular weight of up to about 5000 or more. However, the relatively low molecular weight fraction more typically has an $M_w$ in the range of from about 150, preferably from about 200, more preferably from about 250, up to about 3000, preferably up to about 2000, more preferably up to about 1000. In the case where the low molecular weight fraction has a $M_w$ of 700 or less, the low molecular weight fraction is usually a liquid when separated from the high molecular weight fraction. The relatively low molecular weight fraction generally constitutes about 40–99%, preferably about 70–99%, more preferably about 90–99%, of the weight of the poly(ethylene oxide) before fractionation.

Poly(ethylene oxide) polymers having molecular weight distributions as described above can be prepared by reacting an initiator compound and ethylene oxide in the presence of a metal cyanide catalyst complex, as described below. Poly(ethylene oxide) polymers made using such catalysts tend to contain a small high molecular weight fraction.

The poly(ethylene oxide) polymer typically has one or more terminal hydroxyl groups, with the number of these in most cases being determined by the choice of initiator compound that is used to make the polymer. The poly(ethylene oxide) may have as few as one or as many as 8 or more terminal hydroxyl groups per molecule. Poly(ethylene oxide) polymers having up to about 4 hydroxyl groups per molecule are preferred, with those having up to about 3 hydroxyl groups per molecule being more preferred and those having one or two hydroxyl groups per molecule being of most interest. Poly(ethylene oxide) polymers based on functionalized initiators are of particular interest, especially those based on initiators containing alkenyl or alkynyl groups. Initiators including alkenyl or alkynyl groups include, for example, 2,5-dimethyl-3-hexyn-2,5-diol and 2,4,7,9-tetramethyl-5-decyne-4,7-diol, 3-butyn-1-ol, 3-butene-1-ol, propargyl alcohol, 2-methyl-3-butyn-2-ol, 2-methyl-3-butene-2-ol, allyl alcohol and the like. Halogenated initiators include, for example, 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol. Initiators containing other functional groups include nitroalcohols, keto-alcohols, ester-alcohols, cyanoalcohols, hydroxyaldehydes, and the like.

In addition, the poly(ethylene oxide) advantageously contains at least about 50, preferably at least about 65, more preferably at least about 75% of its weight in the form of polymerized ethylene oxide. The remainder of the weight of the poly(ethylene oxide) may be comprised of residue from the initiator compound(s) and/or other oxyalkylene groups containing 3 or more carbons formed by the polymerization of alkylene oxides other than ethylene oxide.

The poly(ethylene oxide) polymer contains the residues of a metallic cyanide polymerization catalyst. These catalysts can be generally represented by the general formula:

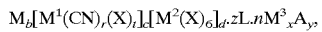

$$M_b[M^1(CN)_r(X)_t]_c[M^2(X)_6]_d \cdot zL \cdot nM^3_xA_y,$$

wherein

M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and z is zero or a positive number (which may be a fraction) indicating the relative quantity of the complexing agent; and n is a positive number (which may be a fraction) indicating the relative quantity of $M^3_xA_y$.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M and $M^3$ are more preferably $Zn^{+2}$, $Fe^{+2}$, $Co^2$, $Ni^{+2}$, $La^{+3}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, and a $C_{1-4}$ carboxylate. Chloride ion is especially preferred.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, $C_{1-4}$ carbonate, oxalate, thiocyanate, isocyanate, isothiocyanate, $C_{1-4}$ carboxylate and nitrite ($NO_2-$) and uncharged species such as CO, $H_2O$ and NO. Particularly preferred groups X are NO, $NO_2-$ and CO.

The catalyst is usually complexed with an organic complexing agent. A great number of complexing agents are potentially useful, although catalyst activity may vary according to the selection of a particular complexing agent. Examples of such complexing agents include alcohols, aldehydes, ketones, ethers, amides, nitriles, sulfides, and the like.

Suitable alcohols include monoalcohols and polyalcohols. Suitable monoalcohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol, glycerine, 1,1,1-trimethylol propane, 1,1,1,-trimethylol ethane, 1,2,3-trihydroxybutane, pentaerythritol, xylitol, atabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis (betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like.

Preferred complexing agents are t-butanol, 1-t-butoxy-2-propanol, polyether polyols having an equivalent weight of about 75–350 and dialkyl ethers of alkylene and polyalkylene glycols. Especially preferred complexing agents are t-butanol, 1-t-butoxy-2-propanol, polyether polyols having an equivalent weight of 125–250 and a dimethyl ether of mono-, di- or triethylene glycol. t-Butanol and glyme (1,2-dimethoxy ethane) are most preferred.

In addition, the catalyst complex contains a quantity of water that is bound into the crystalline lattice of the complex. Although the amount of bound water is difficult to determine, it is believed that this amount is from about 0.25 to about 3 moles of water per mole of $M^1$ and $M^2$ ions.

Typically, the poly(ethylene oxide) polymer contains, before treatment according to the invention, from about 30 to about 10,000 ppm of the metal cyanide catalyst complex. More preferred catalyst complex levels are from about 10, especially from about 25, to about 5000, more preferably about 1000 ppm, most preferably about 100 ppm, on the same basis.

In conducting the method of the invention, the poly (ethylene oxide) polymer is first combined with at least one compound that is a solvent for the low molecular weight fraction, but does not dissolve or only poorly dissolves the higher molecular weight fraction. Because poly(ethylene oxide) polymers are usually highly polar, suitable solvents are generally polar materials of relatively low molecular weight. Among the suitable solvents are alcohols; ketones such as acetone and methyl ethyl ketone; and ethers such as tetrahydrofuran, diethyl ether and the like. The solvent is preferably one that does not react with the poly(ethylene oxide) or the metallic cyanide catalyst. For fractionating a poly(ethylene oxide) in which the desired low molecular weight fraction has a molecular weight of 1000 or below, acetone is an especially preferred ketone solvent.

Of particular interest are aliphatic alcohols of about 2 to about 6 carbon atoms, especially secondary and tertiary alcohols of from 3 to about 6 carbon atoms, acetone and methyl ethyl ketone. Examples of the aliphatic alcohols are ethanol, n-propanol, isopropanol, n-butanol, 2-butanol, t-butanol, n-pentanol, 2-pentanol, 3-pentanol, 2-methyl-2-butanol, 2-methyl-1-butanol, 3-methyl-1-butanol, n-hexanol, 2-hexanol, 3-hexanol, 2-methyl-2-pentanol, 2-methyl-1-pentanol, 3-methyl-1-pentanol, 2-methyl-3-buten-2-ol and the like. The aliphatic alcohols have the property that as the molecular weight of the alcohol increases, its ability to dissolve the higher molecular weight fraction of the poly(ethylene oxide) decreases. For fractionating a poly(ethylene oxide) in which the desired low molecular weight fraction has a molecular weight of 1000 or below, isopropanol is an especially preferred solvent.

Combinations of two or more of these polar solvents may be used. When combinations of solvents are used, it is preferred that the solvents are miscible with each other at the relative proportions used.

A non-polar solvent may be used in conjunction with the polar solvent in order to improve the separation of the low and high molecular weight fractions of the poly(ethylene oxide) polymer. As before, the non-polar solvent is preferably selected together with the polar solvent so that the solvents are miscible at the relative proportions used. Non-polar solvents of particular interest are alkanes having about 4 to about 12, preferably from about 4 to about 8 carbon atoms. Examples of these are n-butane, iso-butane, n-pentane, isopentane, 2,2-dimethylpropane, hexane (including all isomers and mixtures of isomers), 2-methylpentane, 3-methyl pentane, 2,2-dimethylbutane, 2,3,-dimethylbutane, n-heptane, 2-methylhexane, 2,2,-dimethylpentane, n-octane, isooctane, n-decane, isodecane, n-dodecane and the like. n-hexane is a particularly suitable non-polar solvent.

Mixtures of isopropanol with hexane (any isomer or mixture of isomers) and acetone with hexane (any isomer or mixture of isomers) are of particular interest herein.

When mixtures of a polar and non-polar solvent are used, the proportion of non-polar solvent is not so great that the low molecular weight fraction of the poly(ethylene oxide) becomes insoluble. Thus, the non-polar solvent will typically be present in a minor amount, such as up to about 50%, preferably up to about 40%, more preferably up to about 35% of the total weight of solvents. Benefits of using the non-polar solvent are best seen when it constitutes at least about 5%, more preferably at least 10%, of the total weight of solvents.

When two different solvents are used, it is not necessary to blend the solvents before dissolving the low molecular weight fraction into them. Particularly when a mixture of a polar and a non-polar solvent is used, it is often beneficial to first dissolve the poly(ethylene oxide) polymer (or at least the low molecular weight fraction) into the polar solvent, and then add the non-polar solvent to the resulting solution.

Dissolution of the poly(ethylene oxide) into the solvents can be done at any convenient temperature. Generally, lower temperatures are preferred in order to avoid the expense of heating and due to the volatility of many of the preferred solvents. In most instances, dissolution of the low molecular weight fraction is easily achieved at about room temperature, such as from about 0 to about 60° C., preferably from about 15 to about 35° C.

Enough solvent is used to dissolve the low molecular weight fraction. The amount that is used depends in part on how complete a separation is needed between the low molecular weight fraction and the high molecular weight fraction and any metal cyanide catalyst. Removal of catalyst to below 10 ppm levels can be achieved with as little as about 0.25 part by weight solvent per part polymer. Particularly suitable amounts of the solvents are from about 1.01 part, preferably from about 1.5 parts, more preferably from about 2 parts, more preferably from about 2.5 parts to about 10 parts, preferably to about 5 parts, more preferably to about 3 parts by weight per part by weight poly(ethylene oxide) polymer. It has been found that entrainment of the low molecular weight fraction in the high molecular weight fraction is reduced when the amount of solvent is increased to 1.5 or more parts, especially about 2 or more parts by weight of poly(ethylene oxide) polymer). Similarly, reduction of residual catalyst levels in the low molecular weight fraction is improved when at least 1, preferably at least 1.5 and especially when at least 2 parts by weight of the solvent are used. However, in order to avoid handling excessively large quantities of materials, it is preferred to use no more solvent than necessary in order to achieve a good separation of the high and low molecular weight fractions.

An advantage of this invention is that the solution does not require any components other than the solvent(s) and the poly(ethylene oxide) polymer being fractionated. In particular, chelating agents, alkali metals and phosphorous compounds are neither necessary nor desired, and it is preferred that the solution be devoid of any significant amounts of these materials.

Once the solution has been formed, the mixture may be stirred for a period so that low molecular weight polymer molecules are extracted from the high molecular weight fraction.

Cooling may be applied to further enhance the separation. Any method of cooling can be used provided that the solvent(s) do not freeze and significant amounts of the desired low molecular weight fraction do not precipitate from the solution. This cooling tends to help the high molecular weight fraction phase separate from the solution, forming a filterable semi-solid or solid phase. Suitably, the mixture is cooled to from about −20° C. to about +25° C., preferably from about −10° C. to about +15° C. The mixture may remain in a cooled state for about 1 minute to several hours.

The solution containing the low molecular weight fraction of the poly(ethylene oxide) polymer is then separated from the high molecular weight fraction. Because the high molecular weight fraction is typically semi-solid or solid, this separation is conveniently done using solid-liquid separation methods such as filtering, centrifuging, decanting, and the like. When filtering, a filtering aid such as diatomaceous earth may be used in order to improve the filtering process.

The low molecular weight fraction is recovered from the separated solution in any convenient manner. Again, a wide variety of well-known solvent removal techniques are suitable, such as flashing, rotary evaporation, and the like.

In the most preferred embodiment, the recovered low molecular weight fraction has a molecular weight of about 1000 or less, and is a liquid at room temperature. Polymers of this type that are fractionated according to this invention tend to have better clarity than poly(ethylene oxide) polymers of like molecular weight, made using a different process.

Another advantage of this invention is that a very substantial portion of the residual metallic cyanide catalyst is removed from the low density fraction of the poly(ethylene oxide) polymer along with the unwanted high molecular weight fraction. Residual catalyst levels (expressed as metal content) in the isolated low molecular weight fraction are typically below 5 ppm and are often below 2 ppm. Levels below 0.05 ppm are frequently achieved. Stated another way, residual catalyst levels in the isolated low molecular weight are reduced by at least 90%, preferably at least about 95%, more preferably at least about 99.9% by weight, based on the catalyst level of the poly(ethylene oxide) before treatment according to this invention.

Alkali metals and phosphorus compounds can used to precipitate the catalyst, in order to remove it from the high molecular weight fraction, if desired. The precipitated catalyst can then be removed by filtering as described in U.S. Pat. No. 4,877,906.

However, it has been found that the catalyst remaining in the high molecular weight fraction remains active after the fractionation process. Thus, in preferred embodiments, the catalyst is not inactivated or discarded, but instead is reused in further polymerization reactions. This is most easily accomplished by simply mixing the high molecular weight fraction (containing the catalyst) with fresh initiator compound, adding the alkylene oxide (and comonomers if desired), and subjecting the mixture to polymerization conditions as described before. Although the polyethers in the high molecular weight are usually hydroxy-terminated, and thus can theoretically act as initiators in subsequent polymerization reactions, it has been found that little if any molecular weight advancement of the high molecular weight fraction occurs when recycled. Instead, the fresh initiator is preferentially alkoxylated to form the desired molecular weight product.

The recovered low molecular weight poly(ethylene oxide) is useful in a variety of applications, such as detergent and cleaner compositions, oil well drilling fluids, inks, metal working fluids, lubricants in paper coating compositions, ceramics manufacturing, chemical intermediates for organic nonionic surfactants which in turn are used in cosmetics, textiles and chemical processing, polyurethanes which are used as flexible foams and elastomers, chemical intermediates for esters which are used in textile spin finishes, cosmetic agents, and as foam control agents for a wide variety of processes.

The following examples are provided to illustrate the invention, but are not intended to limit its scope. All parts and percentages are by weight unless otherwise indicated.

EXAMPLE 1

A monofunctional poly(ethylene oxide) is made by polymerizing 1024 parts ethylene oxide onto 230.7 parts of 2-methyl-3-butyn-2-ol in the presence of about 5390 ppm of a zinc hexacyanocobaltate/$H_2O$/t-butanol catalyst complex. This corresponds to about 566 ppm Co and 1488 ppm Zn, based on the weight of the crude product to form a crude polyether. The crude product has a number average molecular weight of 560 and a polydispersity of 1.63. It contains a high molecular weight fraction constituting about 5% by weight of the product.

One part of the crude poly(ethylene oxide) is slurried into two parts of isopropyl alcohol and stirred at room temperature. The liquid low molecular weight fraction mixes immediately into the solvent. One part of n-hexane is then added, again at room temperature and the resulting mixture is stirred briefly. The mixture separates into a liquid phase and a solid phase. The solid phase is removed by vacuum filtering the mixture through filter paper and a one-half inch pad of a filtering aid (diatomaceous earth). The retained solids are washed with a portion of a 1:1 mixture of hexane and isopropanol. The filtered solution is then concentrated by rotary evaporation to yield the low molecular weight poly(ethylene oxide) product (about 95% recovery). The low molecular weight poly[]ethylene oxide) product thus recovered contains about 74 parts per billion (ppb) of residual cobalt and about 5 ppb residual zinc. The waxy solid retained on the filter bed consists of a 3200 $M_n$, 1.2 polydispersity poly(ethylene oxide) containing substantially all of the catalyst and only a small amount of entrained low molecular weight poly(ethylene oxide).

EXAMPLE 2

Example 1 is repeated, only this time the weight ratio of crude polymer:isopropanol:hexane is 1:1:1. The recovered low molecular weight fraction contains less than 1 ppm of cobalt and less than 1 ppm zinc. Analysis of the high molecular weight fraction by GPC shows a portion of the low molecular weight fraction has been entrained.

EXAMPLE 3

Example 1 is repeated again, except this time the fractionation is performed using only isopropanol, at a 1:1 weight ratio with the crude polyether. Again, the recovered low molecular weight fraction contains less than 1 ppm each of cobalt and zinc. However, in this experiment, it is noticed that the retained high molecular weight fraction has a significantly higher volume, indicating that significant quantities of low molecular weight species have become entrained in the high molecular weight fraction. Analysis of this material by GPC confirms that the waxy solid consisted of almost equal portions of low and high molecular weight polyol.

EXAMPLE 4

Example 1 is repeated again, except this time the weight ratio of crude polymer:isopropanol:hexane is about 1:0.16:0.14. The recovered low molecular weight fraction contains about 1.7 ppm of cobalt and about 4.5 ppm zinc. However, the high molecular weight fraction is quite large, again indicating a high entrainment of low molecular weight species and an inefficient separation. GPC analysis shows the waxy solid to contain a large quantity of the low molecular weight material entrained in the high molecular weight material, approximately 4:1 by area percent.

EXAMPLE 5

A polyethylene oxide is prepared by reacting 233.8 parts of 2-methyl-3-butyn-2-ol with 950 parts ethylene oxide in the presence of about 3586 ppm of a zinc hexacyanocobaltate/$H_2O$/t-butanol catalyst complex. This corresponds to metal contents of about 377 ppm cobalt and 990 ppm. 252.1 parts of the crude product are mixed with an equal weight of isopropanol, and then 252.1 parts of hexane (a commercially available mixture of isomers containing 85$^+$% n-hexane) are added. The mixture is filtered immediately through a pad of filter aid. The residual wax that is retained on the filter is rinsed with 80 parts of a 1:1 isopropanol/hexane mixture, and the rinse fluid added to the dissolved polymer fraction. After air drying, 12.66 parts of the retained high molecular weight fraction is obtained. The recovered low molecular weight fraction contains about 670 ppb cobalt and about 26 ppb zinc.

EXAMPLE 6

A polyethylene oxide is prepared by reacting 271.9 parts of 2-methyl-3-buten-2-ol with 1100 parts ethylene oxide in the presence of about 4354 ppm of a zinc hexacyanocobaltate/$H_2O$/t-butanol catalyst complex. This corresponds to metal contents of about 479 ppm cobalt and 1197 ppm zinc. The crude product contains about 2.5% by weight unreacted 2-methyl-3-buten-2-ol and has a polydispersity of 1.37. 1158 parts of the crude product are mixed with an equal weight of isopropanol amine, and then 1158 parts of hexane are added. The mixture is chilled in an ice bath for one hour and then filtered through a pad of filter aid. After air drying, 111.06 parts of the retained high molecular weight fraction is obtained. After stripping the solvent, the recovered low molecular weight fraction (1020 g) contains about 31 ppb cobalt and about 24 ppb zinc, and has a polydispersity of 1.3. The high molecular weight wax has an average molecular weight of 4460 and a polydispersity of 2.70.

EXAMPLE 7

A polyethylene oxide is prepared by reacting 536 parts of 2-methyl-3-buten-2-ol with 2345 parts ethylene oxide in the presence of about 371 ppm of a zinc hexacyanocobaltate/$H_2O$/t-butanol catalyst complex. This corresponds to metal contents of about 39 ppm cobalt and 102 ppm zinc. The crude product is mixed with isopropanol and n-hexane at a 1:2:1 ratio. The mixture is chilled in an ice bath for one hour and then filtered through a pad of filter aid. After stripping the solvent, the recovered low molecular weight fraction contains about 9.1 ppb cobalt and about 15 ppb zinc.

EXAMPLE 8

Polyethylene oxide A is prepared by reacting 534.4 parts of 2-methyl-3-butyn-2-ol with 2165 parts of ethylene oxide in the presence of about 2514 ppm of a zinc hexacyanocobaltate/$H_2O$/t-butanol catalyst complex.

100 part of polyethylene oxide A is mixed with 50 parts isopropanol, followed by 50 parts hexane. The mixture is stirred and filtered through a pad of 10 parts filter aid in a course fritted funnel. The funnel is washed with about 20 parts of isopropanol mixture. The recovered liquid (containing the low molecular weight polyethylene oxide fraction) is concentrated by rotary evaporation of the solvent. The weight of the recovered low molecular weight fraction is 86.53 parts, indicating that some of the low molecular weight material is entrained in the solids that are retained on the filter. Metals analysis of the recovered low molecular weight fraction shows 2.4 ppm cobalt, 6.5 ppm zinc and 1.2 ppm potassium.

EXAMPLE 9

100 parts of polyethylene oxide A are fractionated as in Example 8, except 100 parts each of isopropanol and hexane are used. 90.84 parts of low molecular weight polyethylene oxide are recovered. Metals analysis of the recovered low molecular weight fraction shows 2.3 ppm cobalt, 7.5 ppm zinc and 0.9 ppm potassium.

EXAMPLE 10

100 parts of polyethylene oxide A are fractionated as in Example 8, except 150 parts each of isopropanol and hexane are used. 91.47 parts of low molecular weight polyethylene oxide are recovered. Metals analysis of the recovered low molecular weight fraction shows 2.1 ppm cobalt, 8.0 ppm zinc and 2.0 ppm potassium.

EXAMPLE 11

100 parts of polyethylene oxide A are fractionated as in Example 8, except 200 parts isopropanol and 100 parts hexane are used. 91.75 parts of low molecular weight polyethylene oxide are recovered. Metals analysis of the recovered low molecular weight fraction shows 2.3 ppm cobalt, 9.5 ppm zinc and 1.2 ppm potassium.

EXAMPLE 12

100 parts of polyethylene oxide A are fractionated as in Example 8, except 300 parts isopropanol and no hexane are used. 92.88 parts of low molecular weight polyethylene oxide are recovered. Metals analysis of the recovered low molecular weight fraction shows 2.4 ppm cobalt, 8.2 ppm zinc and 2.3 ppm potassium.

EXAMPLE 13

100 parts of polyethylene oxide A are fractionated as in Example 8, except the solvent is 67 parts acetone and 33 parts hexane, and the rinse is done with a 50/50 acetone/hexane mixture. 89.53 parts of low molecular weight polyethylene oxide are recovered. Metals analysis of the recovered low molecular weight fraction shows 3.7 ppm cobalt, 10.8 ppm zinc and 1.8 ppm potassium.

EXAMPLE 14

100 parts of polyethylene oxide A are fractionated as in Example 3, except the solvent is 133 parts acetone and 67 parts hexane. 92.69 parts of low molecular weight polyethylene oxide are recovered. Metals analysis of the recovered low molecular weight fraction shows 3.0 ppm cobalt, 8.4 ppm zinc and 2.3 ppm potassium.

EXAMPLE 15

100 parts of polyethylene oxide A are fractionated as in Example 8, except the solvent is 200 parts acetone and 100 parts hexane. 93.81 parts of low molecular weight polyethylene oxide are recovered. Metals analysis of the recovered low molecular weight fraction shows 3.0 ppm cobalt, 8.8 ppm zinc and 2.2 ppm potassium.

EXAMPLE 16

100 parts of polyethylene oxide A are fractionated as in Example 8, except the solvent is 150 parts acetone and 150 parts hexane. 91.20 parts of low molecular weight polyethylene oxide are recovered. Metals analysis of the recovered low molecular weight fraction shows 3.2 ppm cobalt, 8.4 ppm zinc and 1.1 ppm potassium.

EXAMPLE 17

100 parts of polyethylene oxide A are fractionated as in Example 8, except the solvent is 300 parts acetone. 92.76 parts of low molecular weight polyethylene oxide are recovered. Metals analysis of the recovered low molecular weight fraction shows 5.8 ppm cobalt, 22 ppm zinc and 3.6 ppm potassium.

EXAMPLE 18

A polyethylene oxide is prepared by reacting 236.33 parts of 2-methyl-3-buten-2-ol with 2165 parts ethylene oxide in the presence of about 221 ppm of a zinc hexacyanocobaltate/$H_2O$/t-butanol catalyst complex. This corresponds to metal contents of about 23 ppm cobalt and 61 ppm zinc. The crude product contains about 1% by weight unreacted 2-methyl-3-buten-2-ol and has a polydispersity of about 1.0, with a number average molecular weight of 950. The solid polyol is melted in a 50° C. oven and one part of the crude product is mixed with two parts of isopropanol, and then one part of hexane is added. The mixture is stirred for one hour and then filtered through a pad of filter aid. After stripping the solvent, the recovered low molecular weight fraction (90% recovery) contains about 7 ppb cobalt and has a polydispersity of about 1.0, and a number average molecular weight of 940. The high molecular weight wax has an average molecular weight of 1400 by NMR.

EXAMPLE 19

A polyethylene oxide is prepared by reacting 287.34 parts of allyl alcohol with 1615 parts ethylene oxide in the presence of about 1500 ppm of a zinc hexacyanocobaltate/$H_2O$/t-butanol catalyst complex. This corresponds to metal contents of about 158 ppm cobalt and 414 ppm zinc. The crude product contains about 0.5% by weight unreacted allyl alcohol and has a polydispersity of 1.06, with a number average molecular weight of 320. The polyol is mixed with two parts of isopropanol, and then one part of hexane is added. The mixture is immediately filtered through a pad of filter aid. After stripping the solvent, the recovered low molecular weight fraction (96.6% recovery) has a polydispersity of 1.06 and a number average molecular weight of 320. The high molecular weight wax has an average molecular weight of 5200 by NMR, 5936 by gel permeation chromatography and a polydispersity of 1.77 by GPC (not including a small amount of entrained lower molecular weight material.

EXAMPLE 20

A monofunctional poly(ethylene oxide) is made by polymerizing 665 parts ethylene oxide onto 258.84 parts of 1,3-dichloro-2-propanol in the presence of about 6389 ppm of a zinc hexacyanocobaltate/$H_2O$/t-butanol catalyst complex. This corresponds to about 700 ppm Co and 1725 ppm Zn, based on the weight of the crude product to form a crude polyether. The crude product has a number average molecular weight of 310 and a polydispersity of 1.16. It contains a high molecular weight fraction constituting about 2.64% by weight of the product.

One part of the crude poly(ethylene oxide) is slurried into about two parts of isopropyl alcohol and stirred at room temperature. The liquid low molecular weight fraction mixes immediately into the solvent. About one part of n-hexane is then added, again at room temperature and the resulting mixture is stirred briefly. The mixture separates into a liquid phase and a solid phase. The solid phase is removed by vacuum filtering the mixture through filter paper and a one inch pad of a filtering aid (diatomaceous earth). The retained solids are washed with a portion of a 1:2 mixture of hexane and isopropanol. The filtered solution is then concentrated by rotary evaporation to yield the low molecular weight poly(ethylene oxide) product (about 96% recovery). The waxy solid retained on the filter bed (2.6% by weight of the total) consists of a 7400$M_n$, 1.22 polydispersity poly(ethylene oxide) containing substantially all of the catalyst and only a small amount of entrained low molecular weight poly(ethylene oxide).

EXAMPLE 21

A polyethylene oxide is prepared by reacting 235.05 parts of 2-methyl-3-buten-2-ol with 2165 parts ethylene oxide in the presence of about 221 ppm of a zinc hexacyanocobaltate/$H_2O$/t-butanol catalyst complex. This corresponds to metal contents of about 23 ppm cobalt and 61 ppm zinc. The crude product contains about 1% by weight unreacted 2-methyl-3-buten-2-ol and has a polydispersity of about 1.0, with a number average molecular weight of 950. The solid polyol is melted in a 50° C. oven and one part of the crude product is mixed with two parts of isopropanol, and then one part of hexane is added. The mixture is stirred for one hour and then filtered through a pad of filter aid. After stripping the solvent, the recovered low molecular weight fraction contains about 7 ppb cobalt, has a polydispersity of about 1.0, and has a number average molecular weight of 940. The high molecular weight wax has an average molecular weight of 1400 by NMR. Analysis by GPC shows the wax to have a bimodal distribution consisting of a high molecular weight fraction having a number average molecular weight of 2137 and containing an almost equal quantity of the low molecular weight product having a number average molecular weight of 836. This high molecular weight wax is calculated to contain 0.003 g of catalyst per gram of wax.

2-Methyl-3-buten-2-ol (0.1342 g) and 0.5112 g of the high molecular weight wax fraction isolated above are charged into dried Wheaton vial fitted with a stir bar. The vial is sealed with a septum cap and purged with nitrogen. About 0.5 g of ethylene oxide is added by syringe and the septum cap is replaced with a solid cap under nitrogen. The vial is sealed and heated and stirred at 90° C. for 14 hours. GPC analysis confirms that the 2-methyl-3-buten-2-ol has initiated a polymerization to form a polyethylene glycol with a number average molecular weight of 479. The high molecular weight fraction contained within the wax is almost unchanged and the residual low molecular weight product originally contained in the wax having a number average molecular weight of 836 has increased its molecular weight to a number average molecular weight of 951.

EXAMPLE 22

A monofunctional poly(ethylene oxide) is made by polymerizing 665 parts ethylene oxide onto 258.84 parts of 1,3-dichloro-2-propanol in the presence of about 6389 ppm of a zinc hexacyanocobaltate/$H_2O$/t-butanol catalyst complex. This corresponds to about 700 ppm Co and 1725 ppm Zn, based on the weight of the crude product to form a crude polyether. The crude product has a number average molecular weight of 310 and a polydispersity of 1.16. It contains a high molecular weight fraction constituting about 2.64% by weight of the product.

One part of the crude poly(ethylene oxide) is slurried into about two parts of isopropyl alcohol and stirred at room temperature. The liquid low molecular weight fraction mixes immediately into the solvent. About one part of n-hexane is then added, again at room temperature and the resulting mixture is stirred briefly. The mixture separates into a liquid phase and a solid phase. The solid phase is removed by vacuum filtering the mixture through filter paper and a one inch pad of a filtering aid (diatomaceous earth). The retained solids are washed with a portion of a 1:2 mixture of hexane and isopropanol. The filtered solution is then concentrated by rotary evaporation to yield the low molecular weight poly(ethylene oxide) product (about 96% recovery). The waxy solid retained on the filter bed (2.6% by weight of the total) consists of a 7400 $M_n$, 1.22 polydispersity poly(ethylene oxide) containing substantially all of the catalyst and only a small amount of entrained low molecular weight poly(ethylene oxide).

What is claimed is:

1. A method for purifying a poly(ethylene oxide) polymer containing a lower molecular weight fraction, and at least one higher molecular weight fraction, comprising
    (a) mixing:
        (1) said poly(ethylene oxide) polymer, and
        (2) a solvent or mixture of solvents, said solvent or mixture of solvents, being a solvent for said low molecular weight fraction but not for said high molecular weight fraction,
in relative amounts and under conditions such that a solution of said low molecular weight fraction in said solvent or mixture of solvents forms; and
    (b) separating said solution from said high molecular weight fraction.

2. The method of claim 1 wherein at least two parts by weight of the solvent or mixture of solvents are used per part of the poly(ethylene oxide) polymer.

3. The method of claim 1 wherein the solvent or mixture of solvents is a mixture of a polar solvent and a non-polar solvent.

4. The method of claim 3, wherein the low molecular weight fraction of the poly(ethylene oxide) has a weight average molecular weight of less than about 1000 daltons.

5. The method of claim 4 wherein the solvent or mixture of solvents is isopropanol or a mixture of isopropanol and hexane.

6. The method of claim 4 wherein the solvent or mixture of solvents is acetone or a mixture of acetone and hexane.

7. The method of claim 1 wherein the solvent is a polar solvent selected from the group consisting of alcohols, ketones and ethers.

8. The method of claim 1 wherein said high molecular weight fraction is recycled into a subsequent polymerization process.

9. A method for removing a metal cyanide catalyst from a poly(ethylene oxide) polymer containing a metal cyanide catalyst, a lower molecular weight fraction and at least one higher molecular weight fraction, the method comprising
    (a) mixing:
        (1) said poly(ethylene oxide) polymer, and
        (2) a solvent or mixture of solvents, said solvent or mixture of solvents being a solvent for said low molecular weight fraction but not for said metal cyanide catalyst or said high molecular weight fraction;
in relative amounts and under conditions such that a solution of said low molecular weight fraction in said solvent or mixture of solvents forms and
    (b) separating said solution from said high molecular weight fraction and said metal cyanide catalyst, and
    (c) recovering said low molecular weight fraction from said solution.

10. The method of claim 9 wherein at least two parts by weight of the solvent or mixture of solvents are used per part of the poly(ethylene oxide) polymer.

11. The method of claim 10 wherein said high molecular weight fraction is recycled into a subsequent polymerization process.

12. The method of claim 9 wherein the solvent or mixture of solvents includes a ketone or aliphatic alcohol having up to 6 carbon atoms.

13. The method of claim 9 wherein the mixture of solvents is a mixture of a polar solvent and a non-polar solvent.

14. The method of claim 13 wherein the low molecular weight fraction of the poly(ethylene oxide) has a weight average molecular weight of less than about 1000 daltons.

15. The method of claim 9 wherein the solvent or mixture of solvents is isopropanol or a mixture of isopropanol and n-hexane.

16. The method of claim 9 wherein the solvent or mixture of solvents is acetone or a mixture of acetone and hexane.

17. The method of claim 9 wherein the recovered low molecular weight fraction contains less than 2 ppm of metals from the metal cyanide catalyst.

18. The method of claim 9 wherein the recovered low molecular weight fraction contains residual catalyst levels, expressed as metal content, of below 5 ppm.

19. The method of claim 9 wherein the recovered low molecular weight fraction contains residual catalyst levels, expressed as metal content, of below 1 ppm.

20. The method of claim 9 wherein the recovered low molecular weight fraction contains residual catalyst levels, expressed as metal content, of below 0.05 ppm.

21. The method of claim 9 wherein said high molecular weight fraction is recycled into a subsequent polymerization process.

* * * * *